Figure 1:
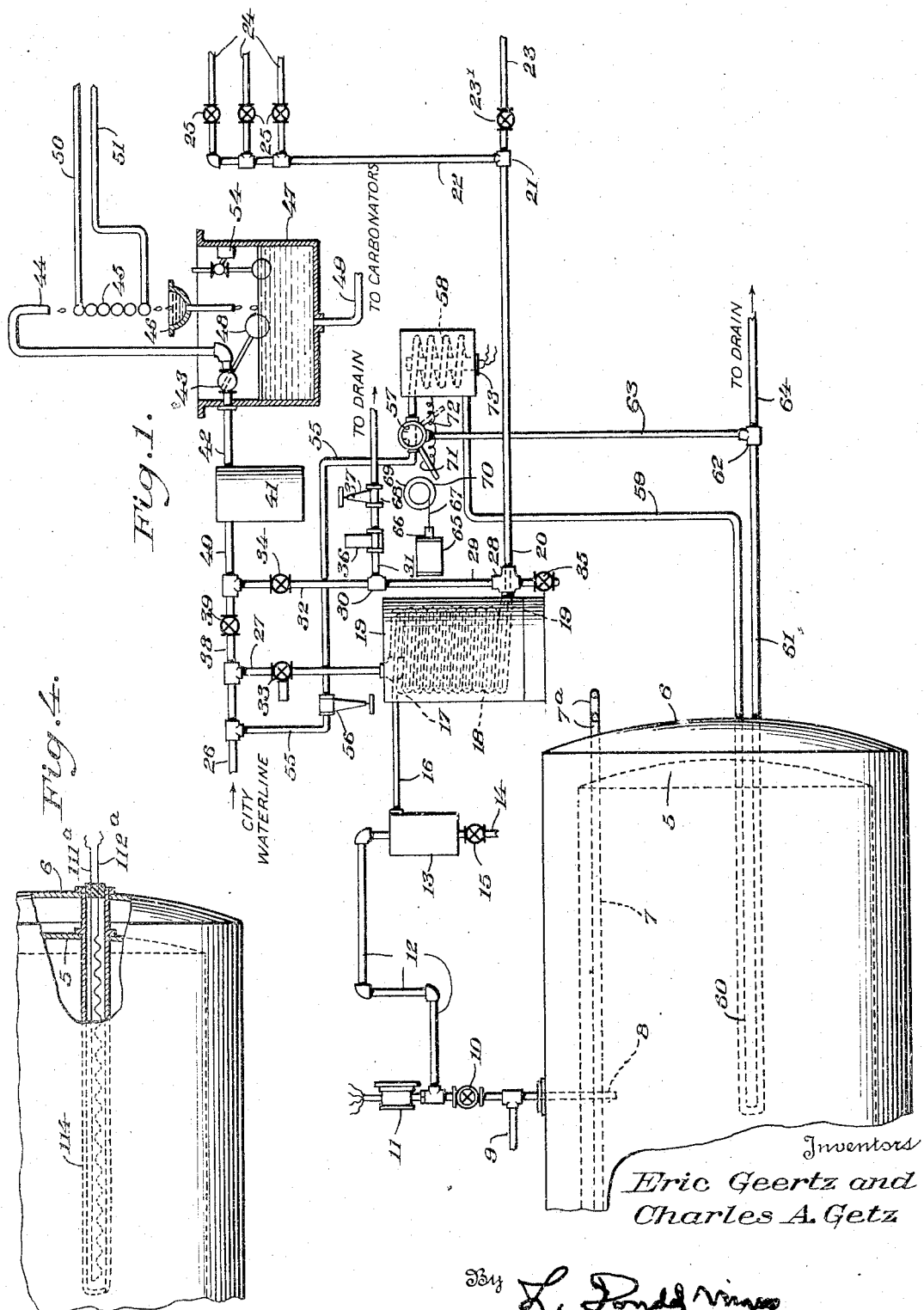

Patented June 22, 1943

2,322,625

UNITED STATES PATENT OFFICE 2,322,625

METHOD AND APPARATUS FOR CONDITIONING AND SUPPLYING WATER AND CARBON DIOXIDE TO CARBONATORS

Eric Geertz and Charles A. Getz, Glen Ellyn, Ill., assignors, by mesne assignments, to Reconstruction Finance Corporation, Chicago, Ill., a corporation of the United States Application September 11, 1941, Serial No. 410,468

22 Claims. (Cl. 62—1)

This invention relates to methods of and apparatus for conditioning and supplying water and carbon dioxide to carbonators used in beverage bottling plants.

Present day plants engaged in the bottling of soft drinks and other beverages are operated on the principle of delivering to carbonators water, which is suitable for human consumption, at a substantially constant temperature which is just slightly above the freezing point. A very accurate control of the water temperature is necessary in order to obtain a constant, uniform maximum amount of carbonation. As the temperature of water obtained either from the city mains or from an artesian well is never at the desired low temperature at which the carbonators are operated, it is necessary to employ refrigeration for the water to obtain the necessary accurate control.

The carbon dioxide vapors used in the carbonators to produce the carbonated water heretofore has been drawn from a suitable bank of commercial cylinders and delivered to the carbonators through suitable pressure regulators which will lower the high pressure always prevailing in the cylinders to the low operating pressure of the carbonators. It is as important to maintain an accurate control of the carbon dioxide pressure in the carbonators as it is to maintain an accurate control of the water temperature. The carbon dioxide stored in the bank of cylinders is subjected to the temperature of the surrounding atmosphere and consequently the pressure of the withdrawn vapors varies from season to season, day to day, and even hour to hour. The withdrawal of vapors from the cylinders, also, lowers the pressure of the remaining carbon dioxide and the more or less constant substitution of fully charged cylinders for exhausted ones results in varying the pressure of the withdrawn vapors. These constantly varying pressures prevailing in the discharge line from the bank of cylinders necessitates maintaining constant supervision over the pressure regulators or the desired uniform pressure will not be maintained in the carbonators.

The constant withdrawal of nothing but carbon dioxide vapors from the bank of cylinders produces a self-cooling or self-refrigerating action which is applied to the liquid remaining in the cylinders. This action is caused by the evaporation of liquid in the cylinders to replace the vapors which are withdrawn. As the vapor pressure in the cylinders corresponds directly with the temperature of the liquid, this self-cooling or self-refrigeration of the liquid causes the vapor pressure to drop with the result that the pressure regulators must be adjusted to compensate for this factor.

If the discharge of vapors from the cylinders continues for a sufficient length of time and at a sufficiently rapid rate, the temperature of the remaining liquid will be lowered to the value at which the liquid will solidify. This temperature value is approximately −70° F. while the vapor pressure is approximately 75 pounds per square inch, absolute. Naturally, it is impossible to withdraw carbon dioxide vapors from cylinders in which the remaining liquid has been solidified. Further discharge from cylinders affected in this way cannot be obtained until sufficient heat has been absorbed from the surrounding atmosphere to cause sublimation of the solid carbon dioxide. Continuous discharge of approximately three-quarters of a starting charge in a cylinder will result in solidifying the remaining one-quarter.

The carbon dioxide vapors, in passing from the high pressure side to the low pressure side of the pressure regulators, are subjected to a throttling action which brings about a drop in temperature. As the drop in temperature, resulting from throttling, is in direct proportion to the reduction in pressure, it is impossible to deliver carbon dioxide vapors to carbonators at a constant temperature unless the pressures on both sides of the regulators are maintained at constant values. It will be appreciated that it is extremely difficult to maintain a constant temperature for the vapors entering the carbonators when the vapor pressure on the high pressure side of the regulators is almost constantly varying and through wide limits.

It was pointed out above that the carbon dioxide confined in the usual commercial cylinders is constantly subjected to the varying temperatures of the surrounding atmosphere. The vapor pressure of the carbon dioxide in the commercial cylinders will fall between 854 pounds and 968 pounds per square inch, absolute, when the temperature of the surrounding atmosphere is between 70° F. and 80° F. Although the vapor pressure maintained in the carbonators of different plants may vary, within certain limits, it is the usual practice to employ a pressure which falls below 100 pounds per square inch. Therefore, pressure drops at the pressure regulators of from 700 pounds to 800 pounds will take place when the liquid carbon dioxide in the commercial cylinders is subjected to the comparatively common temperature range of from 70° F. to 80° F.

The throttling effect produced by temperature drops of from 700 pounds to 800 pounds will cause the carbon dioxide vapors to be lowered to a temperature below 32° F. and will cause freezing of any water vapors passing through the pressure regulators with the carbon dioxide vapors. The carbon dioxide vapors withdrawn from commercial cylinders very frequently contain some water vapors. Therefore, it is necessary to provide some form of preheating means for superheating the vapors just before they are delivered to the pressure regulators or frozen water vapors will cause faulty operation of the regulators.

In an application filed by Charles A. Getz, on November 18, 1940, and bearing Serial Number 366,194, there are disclosed and claimed methods and apparatus for conditioning and supplying water and carbon dioxide to carbonators in which the carbon dioxide is stored in bulk in large capacity, heat insulated tanks at a preselected narrow range of subatmospheric temperatures and their corresponding vapor pressures. During periods when the bottling plants are in operation, the desired narrow range of temperatures and pressures is maintained by alternately withdrawing carbon dioxide liquid and vapors from the tanks for delivery to the carbonators. Starting with a vapor pressure in a storage tank which corresponds with the minimum vapor pressure of the aforementioned narrow range, liquid carbon dioxide is withdrawn from the tank until the vapor pressure rises to the maximum value of the range, which rise will be caused by the absorption of heat through the insulation of the tank and the rise in temperature which results from this absorption. When the maximum pressure of the range is reached, the withdrawal is automatically changed over to vapor, and this type of withdrawal continues until self-refrigeration, resulting from vaporization of liquid to take the place of the withdrawn vapors, again lowers the vapor pressure in the tank to the minimum value of the range. When this minimum value is reached, the withdrawal is automatically changed back to liquid. This cycle of alternately withdrawing vapors and liquid is repeated as often as is necessary to maintain the desired pressure and temperature control.

During prolonged shut down periods, such as over week ends or holidays, of a bottling plant equipped with this type of carbon dioxide supply, the vapor pressure of the stored liquid is prevented from rising above a preselected extreme pressure value, which may bear any desired relation to the maximum value of the operating pressure range, by refrigerating the stored liquid.

The methods and apparatus of the aforesaid application further operate on the principle of employing drinking water from city mains or suitable wells going to the carbonators as a source of heat for vaporizing the liquid carbon dioxide withdrawn from the storage tank and for heating the vapors thus formed as well as the vapors withdrawn directly from the tank before they are delivered to the pressure regulators in advance of the carbonators. This preheating of the vapors by the city or well water not only helps to lower the temperature of the water so that less refrigeration of the same is necessary, but also has the effect of preventing the throttling action, caused by pressure drop at the pressure regulators, from lowering the temperature of the vapors to 32° F., or the temperature at which water vapors in the carbon dioxide will freeze.

The present invention is in the nature of a modification of the invention covered by the aforesaid application. It, likewise, stores the liquid carbon dioxide in bulk in large capacity, heat insulated tanks at a preselected narrow range of subatmospheric temperatures and their corresponding vapor pressures. Additionally, it partially cools the city water going to the carbonators and raises the temperature of the carbon dioxide vapors, delivered to the pressure regulators in advance of the carbonators, by bringing the two fluids in heat exchange relation. The liquid in storage during prolonged shut down periods, also, is prevented from rising above any desired extreme pressure value by applying refrigeration thereto.

It is, however, the primary object of this invention to provide methods and apparatus for conditioning and supplying carbon dioxide vapors to carbonators of beverage bottling plants by withdrawing nothing but vapors from the bulk storage tanks and maintaining the liquid remaining in the tanks within the preselected narrow range of subatmospheric temperatures and their corresponding vapor pressures by applying heat, in automatically controlled amounts, to the liquid to compensate for the self-refrigeration resulting from the withdrawal of vapors.

A further important object of the invention is to employ water from city mains, or some other suitable source, either with or without additional heat being applied thereto, as the medium for heating the stored liquid carbon dioxide to counteract the aforesaid self-refrigeration effect.

Still another object of the invention is to provide methods and apparatus for supplying the required amount of water, at the desired constant low temperature, to carbonators for beverage bottling plants by employing the low temperatured vapors discharged from the storage tank or the low temperature of the liquid remaining in the storage tank as means of refrigeration for the water.

Other objects and advantages of the invention will be apparent during the course of the following description.

Figure 2:
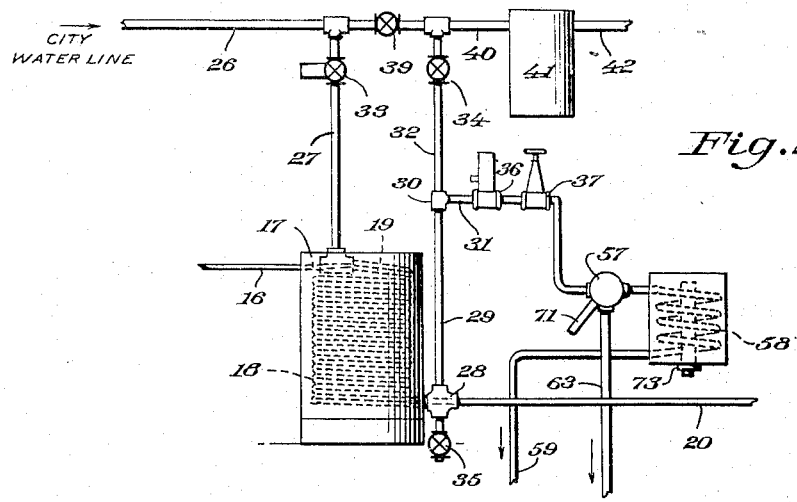
Figure 3:
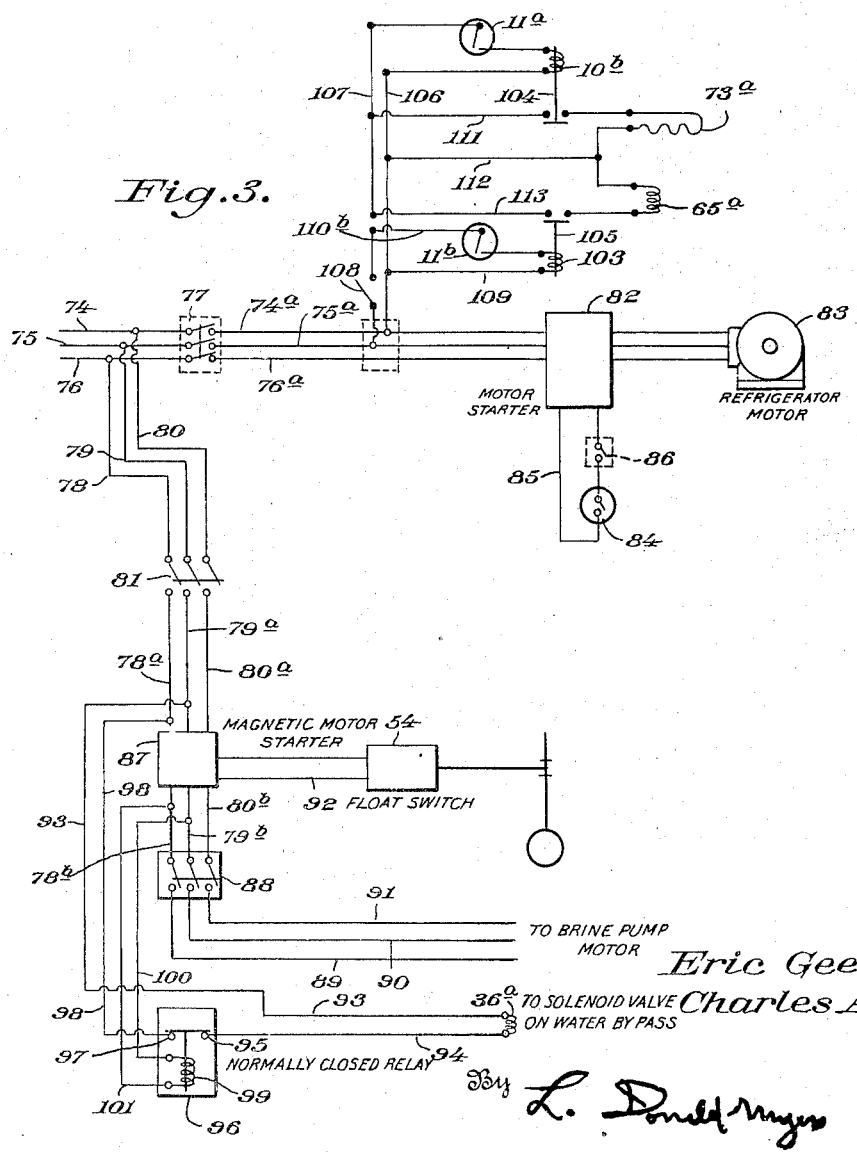
Figure 5:
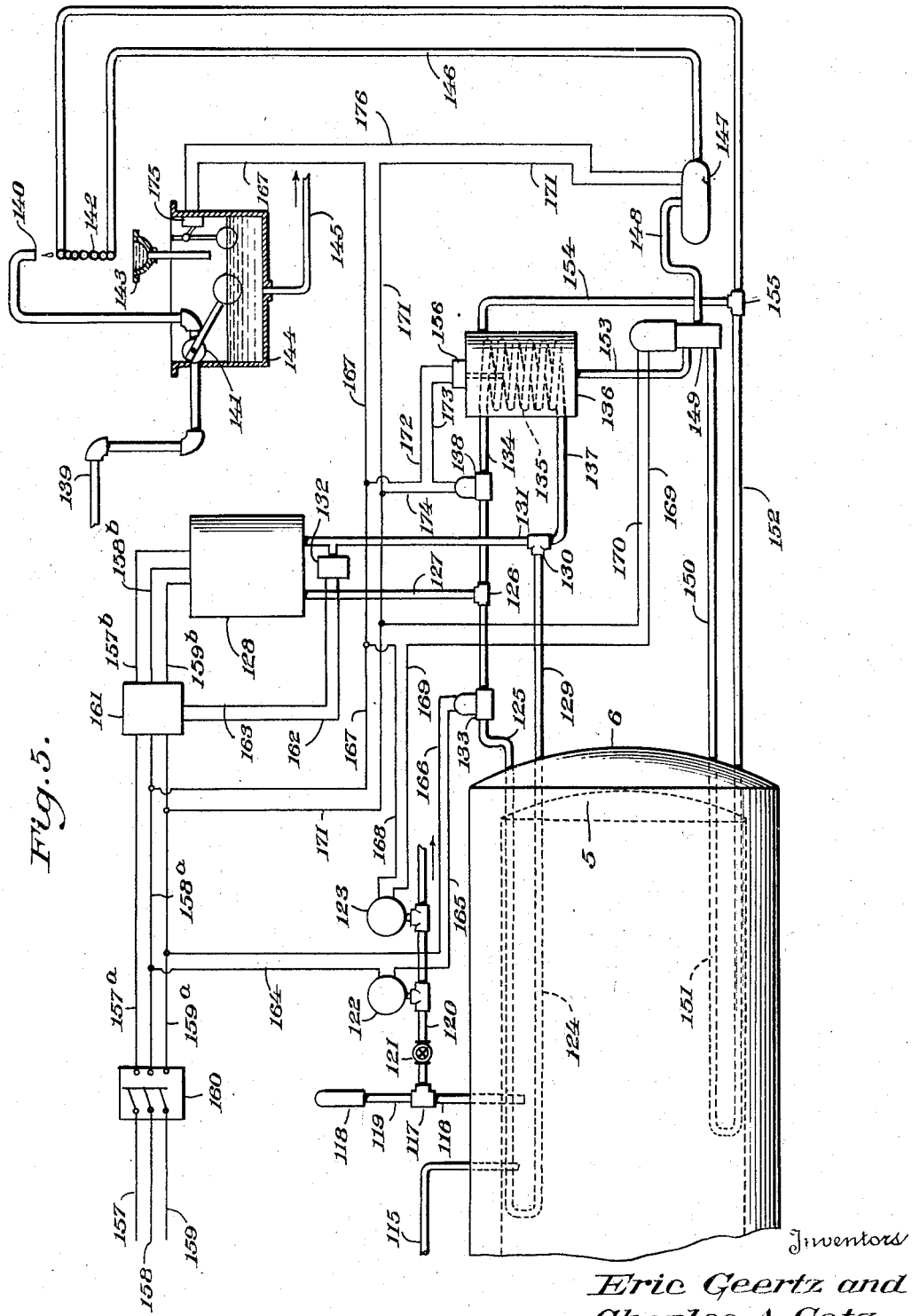

In the accompanying drawings forming a part of this specification and in which like numerals are employed to designate like parts throughout the same, Figure 1 is a diagrammatic view of the apparatus of a beverage bottling plant which will function to supply carbon dioxide vapors of substantially constant pressure to the pressure regulators of carbonators and to supply the drinking water, at a constant temperature, to the carbonators, Figure 2 is a fragmentary, diagrammatic view of a modification of a portion of the apparatus disclosed in Fig. 1, Figure 3 is a diagrammatic view of the electric wiring system and automatic controls employed with the apparatus disclosed in Fig. 1, Figure 4 is a detail, fragmentary view, of a portion of an insulated bulk storage tank with a modified form of heat applying means associated therewith, and Figure 5 is a diagrammatic view of apparatus of a beverage bottling plant, and the electric wiring system with its automatic controls for said plant, which will accomplish the same general objects as the apparatus of Fig. 1.

In the drawings, wherein for the purpose of illustration are shown the preferred embodiments of this invention, and first particularly referring to Fig. 1, the reference character 5 designates a bulk storage tank which is completely enclosed within the relatively thick layer of insulating material 6. Of course, a suitable finishing sheathing or covering, not specifically illustrated, is applied to the exterior of the insulation. The enclosing of the bulk storage tank in insulating material is for the purpose of retarding the input of heat from the surrounding atmosphere. As no perfect insulation has been developed so far, heat will be absorbed by the carbon dioxide confined in the tank and this input of heat will bring about an increase in temperature and pressure of the stored carbon dioxide which will be helpful to a limited extent in carrying out the desired objects of the invention. The bulk storage tank 5 may be provided with any desired capacity which is most suitable for the beverage bottling plant in which the illustrated apparatus is installed. The maximum capacity for any tank so far installed for the bulk storage of liquid carbon dioxide is 125 tons, but there is no known reason why larger capacities cannot be provided if desired. Of course, any desired lower capacity tank may be employed, and it has been determined that tanks holding 2, 3½, 4, 6, and 8 tons are ample for many beverage bottling plants.

The ability to employ single bulk storage tanks for the carbon dioxide required by beverage bottling plants is dependent upon maintaining the stored liquid below a predetermined extreme pressure value which is considerably below the vapor pressure of 854 pounds per square inch that corresponds with a temperature of 70° F. Pressure tanks having A. S. M. E. pressure ratings of 325 pounds have been found to be entirely satisfactory if the maximum pressure maintained in the tank does not exceed approximately 300 pounds per square inch.

It will be assumed, therefore, that the tank 5 has a maximum safety pressure rating of 325 pounds per square inch and that the system will be operated so that the vapor pressure of the liquid carbon dioxide stored in the tank will not be permitted to exceed approximately 300 pounds per square inch. To accomplish this desired result, a refrigerating coil 7 is located in the vapor space of the tank 5 and is connected by the pipe lines 7a to any standard make of mechanical refrigerating machine, not shown, which has a sufficient capacity for the particular tank involved. The function of this refrigerating coil 7 is to condense carbon dioxide vapors in the upper vapor space of the tank 5 so that the drops of condensation may be returned, by gravity, to the liquid in the lower part of the tank.

As the carbon dioxide is withdrawn from the tank 5 for use in the bottling plant, the supply of carbon dioxide is replenished in any desired manner. There is available at this time a carbon dioxide distribution system which embodies the transportation of liquid carbon dioxide in bulk transportation trucks and railway tank cars. By means of such transportation devices, liquid carbon dioxide can be obtained by beverage bottling plant operators which is already at a desired subatmospheric temperature which corresponds with the temperature of the liquid stored in the tank 5. In other words, liquid carbon dioxide will be delivered in any desired quantities and in a condition where its pressure will be approximately 300 pounds per square inch. This liquid carbon dioxide will be charged into the storage tank 5 from the proper transportation vehicle at a vapor pressure of approximately 300 pounds. The liquid spaces of the storage tank 5 and the tank of the vehicle will be placed in communication by any suitable piping, which has not been shown, and a suitable pump may be employed in this piping to accomplish the desired transfer of the liquid. The vapor spaces of the two tanks, also, will be placed in open communication with each other. Fig. 1 discloses a vapor draw off line 8 for the tank 5 which leads to the exterior thereof and is provided with a branch line 9 that is employed during the charging of liquid carbon dioxide into the tank 5 to connect the vapor space of this tank with the vapor space of the transportation vehicle. It was explained above that the refrigerating coil 7, and a suitable commercial refrigerating machine which has not been disclosed, are employed for preventing the vapor pressure in the tank 5 from exceeding the preselected extreme maximum pressure value. If, for some reason, the refrigerating machine is rendered inoperative, the vapor pressure in the tank 5 is prevented from exceeding said extreme maximum pressure value by means of suitable bleeder valves and safety discs, both not shown, which will operate to release carbon dioxide vapors and effect self-refrigeration of the remaining liquid. For example, if the refrigerating machine connected to the coil 7 is provided with a suitable automatic control device which will cause the machine to operate when the vapor pressure in the tank 5 reaches an extreme maximum value of 300 pounds per square inch, one or more bleeder valves may be provided and set for operation at slightly higher values; for example, at 5 pound pressure increases. If we assume that two bleeder valves are provided which will operate respectively at 305 pounds and 310 pounds, these valves will only perform their intended functions in case the refrigerator plant fails to operate when the vapor pressure in the tank reaches 300 pounds. Two or more bleeder valves are employed and set for operation at relatively higher values so that, for example, the valve set at 310 pounds will only operate in case the valve set for 305 pounds fails. A safety or rupturable disc is employed as the final or ultimate safety device. This disc will blow out if the pressure in the tank reaches the aforementioned safety rating of 325 pounds per square inch and all of the stored liquid will be released.

As has been stated above, carbon dioxide will only be withdrawn from the storage tank 5 in vapor form and this withdrawal will always be through the pipe 8. A manually operable shut-off valve 10 is provided in this line for controlling the on and off periods and the rate of discharge of the vapors. A pressure-operated mercoid switch device 11 is connected in the line 8 and will be subjected to the vapor pressure in the tank 5 when the vapor control valve 10 is open. It will be explained at a later point that this mercoid switch 11 includes two circuit making and breaking devices for one of the systems to be described in detail and only one circuit making and breaking device for a modified form of system.

The vapor draw-off line 8 is connected by suitable piping 12 to a strainer 13, having a drain 14 which is controlled by the valve 15. The strainer 13 has connected to its discharge a line 16 which is connected with the inner tube 17 of a double tube heat exchanger coil 18. No detail disclosure of this double tube heat exchanger coil is provided because it merely consists of the inner tube 17 which is concentrically arranged within the bore of the outer tube 19. The discharge end of the inner tube 17 is connected to the pipe line 20 which extends to the T-coupling 21. From this coupling two lines 22 and 23 extend. The pipe line 22 is connected to any suitable number of branch lines 24 which in turn extend to the carbonators of the bottling plant. Coupled in each branch line 24 is a pressure regulator 25. Each one of these regulators is manually adjustable and functions to reduce the pressure of the carbon dioxide vapor passing therethrough so that the carbonators will be subjected to the desired, constant vapor pressure. The pipe line 23, with its control valve 23', may be employed for connecting a bank of commercial carbon dioxide cylinders, not shown, to the system in case the bulk storage tank type of supply must be placed out of operation, for some unusual reason.

It will be explained at a later point that the vapor pressure of the liquid carbon dioxide in the tank 5 will be maintained within a relatively narrow range of low temperatures and pressures during the withdrawal of vapors from the tank for delivery to the carbonators, i. e., a temperature and pressure range which is considerably below the 300 pounds per square inch extreme pressure value maintained by the refrigerating coil 7 and its refrigerating machine. However, assuming that the vapor pressure of the liquid will never materially exceed a value of approximately 300 pounds per square inch, the carbon dioxide vapors withdrawn from the tank 5 and delivered to the carbonators will have a temperature which does not exceed the temperature value for the 300 pound vapor pressure. This temperature will be approximately 0° F. As a temperature of around 33° F. is desired in the carbonators, and as the drinking water supplied to the carbonators must be reduced in temperature before delivery to the carbonators, the heat exchanger coil 18 is employed as a means for partially accomplishing the reduction in temperature of the drinking water.

The pipe line 26 bears the legend "City water line" and is connected to the city main. It will be understood, however, that this pipe line 26, also, may be connected to a suitable artesian well, or the like, if the water supply for the carbonators is obtained from such a source. A branch line 27 connects the water supply line 26 to one end of the outer tube 19 of the heat exchanger coil 18. The lower end of this outer tube 19 is connected to a suitable coupling 28 which has joined thereto a pipe line 29. A T-coupling 30 is located in the line 29 for connecting thereto a by-pass 31. The coupling 30 also connects to the line 29 an extension 32.

A combined shut-off valve and air vent valve 33 is coupled in the pipe line 27 while a shut-off valve 34 is coupled in the pipe line 32. A drain valve 35 is connected to the coupling 28 so as to drain water from the lines 27, 29, and 32, as well as the outer tube 19 of the heat exchanger coil 18, when such a procedure is desirable. The by-pass line 31 has connected therein a solenoid valve 36 and a manually controlled throttling valve 37. This by-pass line 31 extends to a suitable drain, or the like, for discharge into a sewer, or other means of disposal.

A by-pass 38 is connected to the upper ends of the pipe lines 27 and 32 and is provided with a shut-off valve 39. This valve 39 is normally closed so that the flow of water will be down through the heat exchanger coil 18 and then back up through the pipe lines 29 and 32. However, the valves 33 and 34 can be closed to cut off the flow of water through the heat exchanger coil and the valve 39 may be opened to by-pass the water from the supply line 26 directly to the pipe line 40. When the heat exchanger coil 18 is excluded from the water flow path, the closing of the valve 33 will vent this shut-off portion of the water circuit to the atmosphere and the opening of the drain valve 35 will permit the water to be withdrawn from the outer tube 19 of the exchanger coil to prevent its freezing. It will be recognized that passage of the water through the heat exchanger coil along with the passage of low temperature carbon dioxide vapors will cause the vapors to absorb heat from the water and thereby raise the temperature of the vapors and lower the temperature of the water.

Therefore, the water flowing through the pipe line 40 will be at a somewhat lower temperature than the water flowing through the pipe line 26 if this water has passed through the heat exchanger 18. The pipe line 40 conducts the partially cooled water to a suitable filter 41 and is discharged therefrom through a line 42. The pipe line 42 has a float controlled valve 43 connected therein and additionally extends to a point of discharge 44 where the water is caused to flow downwardly over a cooling coil 45. The water, after passing over the cooling coil 45, is collected in a basin 46 and is delivered to a cold water storage tank 47. With this arrangement, the water will be delivered to the tank 47 until the level of the water in the tank operates the float 48 to close the valve 43. From the cold water storage tank 47, the water, at the desired uniform low temperature, is delivered to the carbonators through the pipe line 49.

We now have disclosed the two means employed for lowering the temperature of the water to the desired value for delivery to the carbonators. The first refrigerating step is accomplished by means of the heat exchanger coil 18. The second refrigerating step is accomplished by means of the cooling coil 45. The low temperature of the discharged carbon dioxide vapors accomplishes partial cooling of the water in the heat exchanger coil 18. The low temperature of the brine of a separate refrigerating circuit is employed for the refrigerating action of the cooling coil 45. This coil has its opposite ends connected to pipe lines 50 and 51 which form a part of said brine circuit, not fully shown.

A float controlled switch 54 is associated with the cold water storage tank 47. It will be explained at a later point that this switch 54 functions to control the operation of the solenoid valve 36 in the by-pass line, or drain 31, as well as a brine pump which is connected in the refrigerating circuit that includes the pipe lines 50 and 51. In other words, when the float controlled valve 43 is closed, no water passes through the line 42 to the point of discharge 44 onto the cooling coil 45. The solenoid valve 36 then should be opened so that the water will pass directly to the drain through the pipe line 31. When no water is being discharged onto the cooling coil 45, it is not necessary to operate the electric motor driven pump for the brine circuit. Therefore, the float controlled switch 54 operates to close the circuits to the solenoid valve 36 and the electric motor for the brine pump when the water level in the storage tank 47 is below its predetermined maximum and operates to break the circuits to the solenoid valve 36 and the motor for the brine pump when the level of water in the tank 47 is at or above its predetermined maximum, or when the float controlled valve 43 is closed.

It has been explained above that when carbon dioxide vapors are withdrawn from a space containing liquid carbon dioxide and vapors, a proper amount of the liquid will vaporize to take the place of the withdrawn vapors. This vaporization of liquid carbon dioxide brings about a self-cooling or self-refrigerating of the remaining liquid which is accompanied by lowering of the temperature and pressure of the stored liquid. If the lowering of the temperature and pressure of the stored liquid is permitted to continue for a sufficient length of time, the temperature of the liquid will be lowered to approximately −70° F. and the pressure will drop to approximately 75 pounds per square inch, absolute. At these temperature and pressure values, the liquid carbon dioxide will solidify and no more vapors can be withdrawn from the space until sufficient heat is absorbed by the carbon dioxide to effect sublimation of the same.

It was pointed out above that a certain amount of heat would be absorbed by the liquid as a result of leakage of heat through the insulation 6 of the tank 5. This source of heat input, therefore, will help to counteract the refrigerating action resulting from the withdrawal of nothing but carbon dioxide vapors. If the withdrawal of vapors is at a sufficiently low rate, this source of heat will be adequate to completely counteract the self-refrigerating action. However, the normal withdrawal of carbon dioxide vapors for the average bottling plant will produce a greater self-refrigerating action than can be overcome by the aforementioned heat input for the tank. It becomes necessary, therefore, to apply additional heat to the stored liquid carbon dioxide.

Fig. 1 discloses this additional carbon dioxide heating means as consisting of a pipe line 55 which is connected to the water supply line 26. This pipe line 55 has connected therein a valve 56 which is employed for either completely shutting off the flow of water through the line 55 or for regulating its rate of flow. The pipe line 55 extends to a three-way valve 57. One outlet for the casing of this three-way valve is connected to a heater coil 58. The remaining end of this coil is connected to a line 59 which is suitably joined with one end of a coil 60 that is located at any suitable level in the liquid space of the carbon dioxide storage tank 5. The remaining end of this coil 60 is connected to a pipe line 61 which leads to a T-coupling 62. One branch of this coupling has connected thereto a line 63 which is attached to the second discharge opening of the three-way valve casing 57. The second branch of the T-coupling 62 is connected to a line 64 which leads to a suitable drain or sewer outlet.

The three-way valve 57 is illustrated in Fig. 1 as being conditioned for allowing the water to flow through the pipe line 55 into the coil 58 of the heater and from this coil into the pipe line 59 which delivers the water to the coil 60 located in the liquid carbon dioxide space of the storage tank 5. From this coil 50, the water flows off through the pipe lines 61 and 64 to the drain. The temperature of the city water, of course, is considerably above 32° F. and provides a substantial temperature differential with respect to the temperature of the liquid carbon dioxide stored in the tank 5. Therefore, the carbon dioxide will absorb heat from the liquid passing through the coil 60.

The three-way valve 57 is held in the position illustrated in Fig. 1 by means of the solenoid 65 which has its armature 66 connected by a cable 67 to a peripherally grooved pulley 68. A second peripherally grooved pulley 69, of greater diameter than the pulley 68, has attached thereto a cable 70 which extends to and is connected with the valve operating arm 71. A spring 72 also is connected to this valve operating arm 71 and functions to move the arm substantially 90° when the circuit for the solenoid 65 is broken. Therefore, when the spring 72 has operated the three-way valve 57, through its arm 71, the valve will direct the water from the branch line 55 to the branch line 63 from which it will flow into the drain through the pipe line 64. The three-way valve 57 has a vent, not shown, which is placed in communication with the valve casing outlet which is connected to the heater coil 58 when the spring 72 positions the valve so that the water will drain from this coil, the pipe line 59, the coil 60, and the pipe line 61 through the pipe line 64.

From the above description, it will be noted that the three-way valve 57 operates to either cause city water to flow through the liquid carbon dioxide heating coil 60 and then to a drain or from the line 55 through the pipe lines 63 and 64 directly to the drain without passing through the carbon dioxide heating coil 60. If carbon dioxide vapors are being withdrawn from the tank 5 at such a rapid rate that water at its normal city main temperature will not be sufficient to perform the final action of controlling the temperature of the liquid carbon dioxide, additional heat is applied to the water passing through the heater coil 58. This additional heat may be provided by a suitable electric heater element 73, or by means of any other suitable heating medium, such as steam.

It has been determined that the narrow operating range for the carbon dioxide in the tank 5, during operation of the bottling plant, should be from 200 pounds per square inch, as a minimum, to 225 pounds per square inch, as the maximum. This provides a margin of 75 pounds between the maximum of the operating range and the extreme pressure value of 300 pounds at which the vapor condensing coil 7 will come into play. This 75 pound margin or differential will permit a plant to be shut down for approximately 60 hours before the input of heat through the insulation 6 will raise the pressure of the stored carbon dioxide from the 225 pound maximum of the operating range to the 300 pound extreme pressure value. A shut-down period of 60 hours will take care of plants operating on a five-day week and will allow almost three days time in which to make repairs to the refrigerating machine connected to the coil 7 even if the plant is shut down while the refrigerating machine is being overhauled.

Reference will now be made to Fig. 3 which diagrammatically illustrates the wiring system and the electric control devices, etc., for the apparatus of Fig. 1. The main electrical supply lines of the wiring system are designated by the reference characters 74, 75, and 76. These lines are connected to the respective poles of a triple pole, single throw switch 77. Branch lines 78, 79, and 80 are connected to the main supply lines 74 to 76 to provide a second operating circuit. These lines are connected to the three terminals of a second triple pole, single throw switch 81.

The second set of terminals for the switch 77 have connected thereto the lines 74a, 75a, and 76a which extend to the motor starter 82 for the electric motor 83 which drives the refrigerating machine connected to the condensing coil 7 located in the carbon dioxide storage tank 5. This motor starter 82 operates in response to actuation of the mercoid switch 84 located in the control circuit 85. A manual switch 86 is provided in this control circuit 85 to render the same operative or inoperative. The mercoid switch 84 operates in response to the vapor pressure prevailing in the storage tank 5. For example, when this vapor pressure reaches 300 pounds per square inch, the mercoid switch 84 is actuated to close the control circuit 85 for the motor starter 82 and the electric motor 83 is energized. Operation of this electric motor causes the refrigerating plant connected to the condenser coil 7 to be driven and vapors in the tank 5 will be condensed until the pressure in the tank drops below the 300 pound value which will result in opening the mercoid switch 84.

From the triple pull switch 81, three branch lines 78a, 79a, and 80a extend to the magnetic motor starter 87. Lines 78b, 79b, and 80b extend from the motor starter 87 to a manually operable, triple pole, single throw switch 88. Lines 89, 90, and 91 extend from this switch 88 to the electric motor for the brine pump. The brine pump motor starter 87 is controlled by the circuit 92 which extends to the float actuated switch 54, shown in Fig. 1 as being associated with the cold water storage tank 47. When the water in the tank 47 is below its predetermined maximum level, water is flowing into this tank and the brine pump is driven by its motor as a result of actuation of the float controlled switch 54 and closing of the circuit to the brine pump motor through the starter 87.

The solenoid valve 36, located in the by-pass pipe line 31 has its coil 36a connected by the wire 93 to the branch line 79a. A second wire 94 connects the solenoid coil to the terminal 95 of the normally closed relay 96. The second terminal 97 of this relay is connected by the wire 98 to the branch line 78a. It will be apparent, therefore, that when the triple pole switch 81 is closed, current will flow through the wires 93 and 94 and the normally closed relay 96 to the solenoid valve coil 36a. The winding 99 for the relay 96 is connected by the wire 100 to the wire 79b and by the wire 101 to the wire 78b. The winding 99 of the relay 96, therefore, is under the control of the brine pump motor starter 87 and the float operated switch 54. In other words, when the float operated switch 54 closes the circuit to the brine pump motor starter 87, it also closes the circuit to the winding 99 of the relay 96. Energization of this relay winding 99 breaks the circuit to the solenoid valve coil 36a. When the circuit to the solenoid coil 36a is broken, the solenoid valve 36 is closed. The drinking water then flows from the heat exchanger coil 18 to the storage tank 47 over the cooling coil 45 and the brine pump is in operation. When the float operated switch 54 breaks the control circuit of the brine pump motor starter 87, the brine pump ceases to operate and the relay winding 99 is de-energized. The circuit through the relay then is closed and the solenoid valve coil 36a is energized for holding the solenoid valve 36 open.

A second control circuit is connected to the branch lines 74a and 75a which lead to the refrigerator motor starter 82. This second control circuit includes the two mercoid switches 11a and 11b which are housed in the pressure operated mercoid switch designated by the reference character 11 in Fig. 1. These mercoid switches 11a and 11b have the windings 102 and 103 of relays 104 and 105, respectively, connected in their circuits. Current is supplied to the mercoid switch 11a and the relay winding 102 by the branch lines 106 and 107 which extend to the wires 74a and 75a, respectively. A manual control switch 108 is located in the branch line 107. The mercoid switch 11b and the relay winding 103 are supplied with electricity through the branch lines 109 and 110 which are connected to the wires 106 and 107, respectively.

The switch of the relay 104 controls the circuit to the winding 73a of the electric heater 73 which is associated with the water heating coil 58. This circuit for the heater 73a includes the wires 111 and 112 which are connected to the control wires 107 and 106, respectively. The circuit for the winding 65a of the solenoid 65 includes the wire 112, in combination with the heater coil 73a, and the wire 113. The wire 112 is attached to the control branch line 106, while the wire 113 is electrically connected to the branch control wire 107.

It will be apparent from the above description that the pressure in the carbon dioxide storage tank 5 determines the operating periods of the solenoid 65 and the electric heater 73 through the medium of the pressure operated mercoid switches 11a and 11b. Of course, these two mercoid switches may be set to operate at any desired carbon dioxide vapor pressures, but it has been found to be most desirable to have the mercoid switch 11a operate at a vapor pressure of 200 pounds per square inch to close the circuit for the heater coil 73a and to open the circuit to this heater coil when pressures above 200 pounds prevail. It has been determined, also, that the circuit for the solenoid coil 65a should be closed whenever the vapor pressure in the storage tank 5 is at a value of 225 pounds per square inch, or lower. At pressures above 225 pounds, the circuit for the solenoid 65 should be open.

We now have fully described a system which will operate in the following manner:

Let us assume for some abnormal reason that the bottling plant has been shut down for a period greater than 60 hours. The refrigerating device driven by the electric motor 83 and connected to the condenser coil 7 has been in operation to maintain the vapor pressure in the storage tank 5 at a value of approximately 300 pounds per square inch. When the plant resumes operation, the carbon dioxide vapors withdrawn through the line 8 are at this 300 pound pressure.

This withdrawn vapor passes through the heat exchanger coil 18 to the pressure reducers 25 which operate to lower the pressure of the vapors to the desired value below 100 pounds. Water flows from the city main, or from a well, through the pipe line 26 and the line 27 to the heat exchanger 18 and from this heat exchanger through pipe lines 29, 32, 40, and 42 to the point of discharge 44 onto the cooling coil 45. The heat exchanger 18 partially reduces the temperature of this water, while the cooling coil 45 lowers the water temperature to the desired value for being delivered to the storage tank 47. From this tank the water flows through the pipe line 49 to the carbonators. During the flow of water over the cooling coil 45, the brine pump is operated.

We shall now assume that vapors are withdrawn from the tank 5 at a sufficiently rapid rate to cause the pressure in the tank to drop notwithstanding the absorption of heat through the insulation 6 of the tank. The vapor pressure in the tank 5 will continue to drop until it reaches the value of 225 pounds per square inch. At this value, the mercoid switch 11b will be operated to close the circuit for the winding 65a of the solenoid 65. The three-way valve 57 then will be operated by the solenoid 65 for causing water to flow from the water line 26 through the pipe line 55, the heater coil 58, and the pipe line 59 to the coil 60 located in the carbon dioxide storage tank 5. From this coil 60, the water is delivered to the drain through the pipe lines 61 and 64.

If the carbon dioxide vapor pressure still continues to drop and finally reaches a value of 200 pounds per square inch, the mercoid switch 11a will be operated for closing the circuit of the heater coil 73a. Energization of the coil for the heater 73, see Fig. 1, will cause the water passing through the coil 58 to be heated. The electric heater 73 may be of any desired capacity and may be capable of heating the water passing through the coil 58 to any desired high temperature. This superheated water then will flow from the coil 58 through the pipe line 59 to the coil 60 located in the carbon dioxide liquid of the storage tank 5. This hot liquid passing through the coil 60 will supply ample heat to check the drop of pressure in the tank 5 and completely counteract the self-refrigerating action resulting from the withdrawal of vapors through the line 8.

The circuit through the heater coil 73a may be maintained closed until the vapor pressure in the storage tank 5 has risen to any desired value above 200 pounds when the heater coil circuit will be broken. If the rate of withdrawal of vapors is sufficiently reduced, the unheated water flowing through the coil 60 will function to elevate the vapor pressure in the tank 5 to a value above 225 pounds so that the circuit for the solenoid 65 will be broken. The spring 72 will then actuate the three-way valve 57 for diverting the water flowing through the pipe line 55 to the line 63 and from this line to the drain through the pipe line 64.

It should be apparent from the above description that the carbon dioxide vapor pressure in the storage tank 5 will be maintained within the relatively narrow range of from 200 pounds to 225 pounds per square inch during periods of operation of the beverage bottling plant and under normal operating conditions the coil 7 in the storage tank 5 will prevent the vapor pressure in the tank from rising above 300 pounds per square inch pressure during shut-down periods.

Fig. 2 discloses a slight modification of a portion of the system illustrated in Fig. 1. The difference between this Fig. 2 system and the Fig. 1 system is that the water delivered to the liquid carbon dioxide heating coil 60 comes from the by-pass line 31 instead of from the water supply line 26. That is to say, water is only fed to the heating coil 60 when the water which passes through the heat exchanger coil 18 is not going to the cold water storage tank 47. The reference characters employed in Fig. 1 for designating certain elements will be employed in Fig. 2 for identifying the same elements. New reference characters will be applied only to new elements.

Therefore, we have the water supply line 26 connected to the outer tube 19 of the heat exchanger coil 18 by means of the pipe line 27 which has the combined venting and shut-off valve 33 located therein. The coupling 28 connected to the lower end of the outer tube 19 has the pipe 29 attached thereto which leads to the coupling 30. The pipe line 32 leads from one branch of the coupling 30 to the pipe line 46 and has the shut-off valve 34 connected therein. The coupling 30 has a by-pass 31 attached thereto which extends to the inlet for the three-way valve 57. This by-pass line 31 has connected therein the solenoid valve 36 and the throttling valve 37.

One branch of the three-way valve 57 is connected to the water heating coil 58 that has associated therewith the electric heater unit 73. The second discharge branch of the three-way valve 57 has connected thereto the branch pipe line 63, which is shown in Fig. 1 as extending to the T-coupling 62. The three-way valve 57 has its operating arm 71 which is to be operated by the solenoid 65 and the spring 72 in the manner illustrated in Fig. 1. From the water heater coil 58, the pipe line 59 extends for connection with the coil 60 located in the liquid space of the carbon dioxide storage tank 5. The flow of the carbon dioxide vapors through the heat exchanger coil 18 is by means of the pipe 16 and the inner tube 17 which connects at its lower end with the line 20 leading to the pressure reducing valves 25 and the carbonators, not shown.

It is believed to be unnecessary to provide a specific illustration of the wiring diagram for the modified system of Fig. 2. The solenoid valve 36 will be controlled in the same manner by the float operated switch 54 so that water will flow through the by-pass line 31 to the three-way valve 57 when water is not being delivered to the cooling coil 45. The solenoid 65 for the three-way valve operating arm 71 will be operated by the same mercoid switch circuit and relay as is disclosed in Fig. 3. The electric heater for the water coil 58 also will be operated by the mercoid switch and relay circuit of Fig. 3, which includes the switch 11a and the relay winding 102. The only modification which might be deemed to be desirable would be to have the relay 96 control the circuit through the wires 106 and 107 in addition to controlling the circuit through the winding 36a of the solenoid valve 36. In other words, when the relay winding 99 was energized to break the circuit to the winding 36a of the solenoid valve 36, a circuit could be closed through the wires 106 and 107. This could be accomplished by placing two contacts above the relay contacts 95 and 97 and having the relay operated blade engage these two contacts for closing the circuit through the wires 106 and 107 when the blade moved out of contact with the terminals 95 and 97.

Fig. 4 discloses a further modification of means for heating the liquid carbon dioxide stored in the tank 5 to counteract the self-refrigerating action resulting from the withdrawal of vapors from this tank. This Fig. 4 modification consists of employing any suitable number of electric heating coils, or elements, 114 in the liquid space of the tank 5. The circuit wires 111a and 112a may be considered the same as the wires 111 and 112, of Fig. 3, which lead to the electric water heating coil 73a. The mercoid switch 11a and the relay 104, therefore, would operate to control the flow of current through the electric heating units 114. The mercoid switch employed for controlling the circuit through the heating elements 114 could be set to operate so that the circuit would be closed at a vapor pressure value of 200 pounds per square inch, and the setting could be such that the mercoid switch would open the circuit to the heating elements 114 when the vapor pressure value was 225 pounds.

It will be appreciated that the electric heating elements 114 of the Fig. 4 modification may be employed to either entirely displace the heating coil 60, with all of its related elements, and the use of water to raise the pressure of the stored liquid carbon dioxide, or to only displace the heating coil 58 in the water circuit and the electric heater 73 for this latter coil.

It will be appreciated that although the modifications of Figs. 2 and 4 only disclose certain portions of the system completely illustrated in Figs. 1 and 3, the elements of these latter two figures which are not illustrated in Figs. 2 and 4 should be construed as forming a part of the complete systems for the modifications of Figs. 2 and 4.

The previously described embodiments of the invention, and particularly those illustrated by Figs. 1 and 2, employ the higher temperature of city or well water to prevent the temperature of the stored liquid carbon dioxide from dropping below a certain minimum value with its corresponding minimum vapor pressure. The city or well water is wasted after it has accomplished this desired result. The low temperature of the carbon dioxide vapors withdrawn from the storage tank is employed in these previous embodiments to partially refrigerate the water going to the carbonators. A mechanical refrigerator unit is employed for preventing the temperature and the pressure of the stored liquid carbon dioxide from rising beyond a pre-selected extreme pressure value during prolonged shut down periods. Final cooling of the water going to the carbonators was obtained by means of a separate or second refrigerating circuit.

Fig. 5 discloses a further modification of the invention in which the higher temperature of the city or well water, going to the carbonators, is employed for preventing the temperature, and the corresponding vapor pressure, of the stored liquid carbon dioxide from dropping below a predetermined minimum value but the water used for this purpose is not wasted. This extraction of heat from the city or well water and the application of the heat to the stored liquid carbon dioxide, additionally, is employed for effecting refrigeration of the water going to the carbonators. This is accomplished by means of a closed brine circuit which is passed in heat exchange relation with the stored liquid carbon dioxide and the water going to the carbonators. A single mechanical refrigerator unit is employed in this further modification to perform the dual function of preventing the temperature and vapor pressure of the stored liquid carbon dioxide from rising above a preselected extreme pressure value and for lowering the temperature of the brine in the aforementioned closed circuit when the temperature and pressure of the stored liquid carbon dioxide are at such high values that the application of further heat thereto is not desirable and the brine of the closed circuit cannot, therefore, be refrigerated by being passed in heat exchange relation with the stored liquid carbon dioxide.

Fig. 5 illustrates the bulk capacity storage tank 5 for the liquid carbon dioxide with its insulating covering 6. A pipe line 115 is connected to the vapor space of the tank 5 and is employed during charging of the tank with liquid carbon dioxide to establish communication between the vapor space of the storage tank and the vapor space of the tank of the transportation vehicle which is employed for delivering the carbon dioxide to this bottling plant. The pipe line which is employed for connecting the liquid spaces of the two tanks is not shown.

A vapor discharge line 116 extends from the top of the storage tank 5 and is connected to a T-coupling 117. One branch of this coupling has a bleeder valve, of suitable construction, 118 connected thereto by the short pipe section 119. This bleeder valve will function to release carbon dioxide vapors to effect self-cooling or self-refrigeration of the liquid remaining in the storage tank 5 should other refrigerating means, to be described, fail to function to prevent the vapor pressure of the stored liquid carbon dioxide from rising above a preselected extreme pressure value.

The remaining branch of the T-coupling 117 has a pipe line 120 connected thereto. This pipe line leads to the carbonators of the bottling plant. Pressure reducing valves, not shown, of the type designated by the reference character 25 in Fig. 1 will be incorporated in this line 120 in advance of the carbonators. This pipe line 120, also, may have incorporated therein one of the heat exchanger coils 16, shown in Figs. 1 and 2 if desired. A manually operable shut-off valve 121 is provided in the pipe line 120 for controlling the on and off periods and the rate of discharge of the vapors. At suitable points adjacent the bulk storage tank 5, the vapor discharge pipe line 120 has connected thereto a high pressure operated switch 122 and a low pressure operated switch 123. These switches are connected in control circuits which will be dealt with at a later point when the wiring diagram of Fig. 5 is described.

To prevent the vapor pressure of the stored liquid carbon dioxide from exceeding a preselected extreme pressure value during prolonged shut-down periods of the plant, a cooling coil 124 is arranged in the vapor space of the tank 5. One branch of this coil 124 is connected by the pipe line 125 to the T-coupling 126. One branch of this coupling is connected by the pipe line 127 to the discharge line of the mechanical refrigerator unit 128, which is diagrammatically represented in this figure. As this refrigerator unit 128 may be any desired one of the numerous mechanical refrigerator units available on the open market, and having the desired capacity, it is believed to be unnecessary to illustrate this unit in detail. The remaining branch of the cooling coil 124 has connected thereto the pipe line 129 which extends to the T-coupling 130. One branch of this coupling is connected by the pipe line 131 to the inlet branch of the refrigerator unit 128. A pressure switch 132 is connected to the pipe line 131 at any suitable point adjacent the refrigerator unit 128. An electric solenoid operated valve 133 is connected in the pipe line 125 and controls the flow of refrigerant to the cooling coil 124.

From the T-coupling 126 a second pipe line 134 extends to and is connected with one end of the coil 135 located in the heat exchanger 136. The remaining end of this cooling coil 135 is connected by the pipe line 137 to the third branch of the T-coupling 130. An electric solenoid operated valve 138 is connected in the pipe line 134 and operates to control the flow of the refrigerant from the unit 128 to the cooling coil 135.

The water to be fed to the carbonators is obtained from the pipe line 139 which may extend from a city water supply main or from some other suitable source, such as an artesian well. The water flows through this pipe line to the point of discharge 140. A float operated control valve 141 is connected in the pipe line 139 and controls the flow of water therethrough. The water discharged from the point 140 flows downwardly over a cooling coil 142 and empties into a collecting basin 143 which delivers the properly refrigerated water to the cold water storage tank 144. Water flows to this tank until the liquid level therein reaches a predetermined height when the float controlled valve 141 operates to stop the flow. The water, at the desired low temperature, is discharged from the tank 144 through the pipe line 145 which conducts the water to the carbonators.

If this system is operated with the withdrawn vapors from the bulk storage tank 5 passing through a heat exchanger coil 18, see Figs. 1 and 2, the water being delivered to the cold water storage tank 144 may pass through this heat exchanger coil before entering the pipe line 139. As has been explained, the heat exchanger coil 18 is optional equipment with the plant of Fig. 5.

The water cooling coil 142 forms a part of a closed circuit for brine, or the like. This closed circuit includes the pipe line 146 which extends from one end of the cooling coil 142 to the inlet of the brine pump 147. The outlet of this pump is connected to the pipe line 148 which is connected at its remaining end to the inlet opening of the electric solenoid operated three-way valve 149. One of the two outlets for this three-way valve is connected by the pipe line 150 to one end of the heating coil 151 which is located at any desired level in the liquid space of the bulk storage tank 5. The remaining end of this heating coil 151 is connected by the pipe line 152 to the remaining end of the water cooling coil 142. When the brine pump 147 is operated and the three-way valve 149 is properly conditioned to connect the pipe lines 148 and 150, brine will be circulated through the heating coil 151 in the carbon dioxide storage tank 5 and through the cooling coil 142 for the water discharged at the point 140. The low temperature at which the liquid carbon dioxide is stored in the tank 5 will extract heat from the brine while it passes through the coil 151. This extraction of heat by the liquid carbon dioxide will counteract the self-cooling or self-refrigerating effect resulting from the constant withdrawal of vapors through the discharge line 116. The brine, after being cooled by its passage through the coil 151, will flow up to and pass through the coil 142 where it will extract heat from the water and will effect refrigeration of the latter.

The second discharge opening of the three-way valve 149 has connected thereto the pipe line 153 which empties into the bottom of the heat exchanger space surrounding the refrigerating coil 135 of the unit 136. A second pipe line 154 is connected to the upper portion of the heat exchanger space and extends to the coupling 155 which is connected in the pipe line 152.

During periods when the temperature and pressure of the stored liquid carbon dioxide are at high enough values so as not to require the application of heat to the liquid, the three-way valve 149 will be conditioned to direct the brine flowing from the pump 147 through the pipe line 148 to the pipe line 153. The brine then will flow into the heat exchange space of the unit 136 and out of this space through the pipe line 154 to the line 155 where it will flow up to and through the water cooling coil 142. If the temperature of the brine flowing through the heat exchanger unit 136 is not low enough to properly refrigerate the water flowing over the cooling coil 142, the temperature controlled switch 156 will function to actuate the electric solenoid valve 138 for causing the refrigerant of the mechanical refrigerating unit 128 to flow through the heat exchanger coil 135 by way of the pipe lines 134 and 137. This refrigerant will lower the temperature of the brine as it passes through the coil 135. The mechanical refrigerating unit 128, therefore, will maintain the brine at the desired low temperature when the brine coil 151 in the carbon dioxide storage tank is short circuited out of the brine flow path.

Coming now to the wiring circuits for the various controls, the main supply lines 157, 158 and 159 extend to one set of terminals of the manually operable, triple pole, single throw switch 160. The remaining terminals of this switch have the wires 157a, 158a and 159a connected thereto. These three wires extend to the motor starter 161 for the electric motor of the mechanical refrigerator unit 128. The three wires for the refrigerator motor are designated by the reference characters 157b, 158b and 159b. The control circuit for the refrigerator motor starter 161 includes the wires 162 and 163 which extend to the pressure switch 132 that is connected to the refrigerant line 131 so as to be influenced by the pressure of the refrigerant flowing through this line. In other words, this refrigerant pipe line 131 extends to the low pressure side of the compressor of the refrigerator unit 128. This pressure switch 132 will operate to close the control circuit for the refrigerator motor starter 161 whenever pressure conditions in the line 131 require refrigerant to be fed to the carbon dioxide storage tank cooling coil 124 or the brine heat exchanger cooling coil 135. This pressure switch 132, additionally, will operate to stop the refrigerator unit 128 when no refrigeration is required in either of the coils 124 or 135.

In fully describing the mode of operation of the system shown in Fig. 1, it was stated that a preselected extreme pressure value of 300 pounds per square inch, gauge, was preferred for the stored liquid carbon dioxide. The high pressure operated switch 122, which is subjected to the vapor pressure in the storage tank 5, therefore, is set to close the circuit for the electric solenoid valve 133 when the vapor pressure in the storage tank 5 reaches this 300 pound value. This control circuit includes the wire 164 which extends from the wire 158a to one side of the pressure switch 122; a second wire 165 which extends from the other side of the pressure switch 122 to one terminal of the coil of the solenoid valve 133, and a third wire 166 which extends from the second terminal of the solenoid coil of the valve 133 to the main supply line 159a. When the pressure of the vapor in the storage tank 5 reaches the 300 pound value, the solenoid control valve 133 will be opened and the refrigerant from the refrigerator unit 128 will circulate through the cooling coil 124 to condense vapors in the storage tank 5 and lower the temperature and pressure of the stored liquid carbon dioxide. As was described above, the pressure switch 132 will assure operation of the refrigerator unit 128 when refrigerant is required in the carbon dioxide cooling coil 124. The pressure switch 122 will be set to open the circuit to the solenoid valve 133 whenever the temperature and pressure of the stored liquid carbon dioxide have been reduced to any desired values below the aforementioned 300 pound pressure and its corresponding temperature.

Assuming that the system of Fig. 5 should have the narrow operating range for the vapor pressure of the liquid carbon dioxide stored in the tank 5 which was set forth in connection with the system of Fig. 1; i. e., a minimum pressure of 200 pounds per square inch and a maximum pressure of 225 pounds per square inch, the three-way valve 149 should be automatically operated to direct the flow of the brine through the heating coil 151 when the pressure of the stored liquid reaches the minimum value and the flow should be stopped through the heating coil 151 when the pressure has reached the maximum value. To accomplish this desired result, the low pressure switch 123 will close the circuit to the solenoid coil of the three-way valve 149 at 200 pounds and will open the circuit to the solenoid of the valve at 225 pounds. When the circuit is closed to the solenoid coil, the valve will be positioned to direct the brine through the coil 151. When the circuit to the solenoid coil is broken, the valve will be conditioned to direct the brine to the heat exchange space of the heat exchanger unit 136. The electric circuit for the low pressure switch 123 and the three-way valve solenoid coil includes the wire 167 which is connected to the main supply wire 158a. The wire 167 has connected thereto a wire 168 which extends to one terminal of the low pressure switch 123. A wire 169 extends from the second terminal of this low pressure switch to one terminal of the solenoid coil for the three-way valve 149. The second terminal of the solenoid coil has the wire 170 connected thereto and this wire extends to and is connected with the wire 171 which extends to the main supply wire 158a.

It was previously explained that the flow of the refrigerant from the refrigerating unit 128 through the brine cooling coil 135 was controlled by the temperature switch 156 and the electric solenoid operated valve 138. Circuit wires 172, 173 and 174 are provided for this purpose and are connected to the wires 167 and 171.

The float controlled valve 141 was previously described as functioning to bring about delivery of refrigerated water to the storage tank 144 when the level of the water in this tank was below a predetermined height and to stop this delivery when the proper supply of water is available in this storage tank. When no water is passing over the cooling coil 142, it is not necessary or desirable to operate the brine pump 147 to cause circulation of the brine through its closed circuit. Therefore, a float operated switch 175 is associated with the cold water storage tank 144. One end of the previously referred to wire 167 is connected to one terminal of this last mentioned switch. The second terminal of this switch has connected thereto a wire 176 which extends to one terminal of the electric motor, not shown, that drives the brine pump 147. The second terminal of this brine pump motor is connected to the end of the previously described wire 171.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

What we claim is:

1. A method of conditioning and supplying carbon dioxide to carbonators, comprising establishing a supply of liquid carbon dioxide in bulk storage in a heat insulating tank, withdrawing only carbon dioxide vapors from the supply, raising the temperature of the withdrawn carbon dioxide vapors and delivering the heated vapors to the pressure regulators of the carbonators during the entire period of operation of the carbonators, and maintaining the vapor pressure of the carbon dioxide remaining in the supply within a relatively narrow range while the vapors are being withdrawn by applying heat to the carbon dioxide at rates which will balance the self-refrigeration of the carbon dioxide resulting from the withdrawal of vapors.

2. A method of conditioning and supplying carbon dioxide to carbonators, comprising establishing a supply of low temperature liquid carbon dioxide in bulk storage in a heat insulated tank, withdrawing only carbon dioxide vapors from the supply for delivery to the carbonators during the entire period of operation of the carbonators, and passing a brine in a closed circuit in heat exchange relation to the water going to the carbonators and the liquid carbon dioxide remaining in the supply to effect refrigeration of the water and to apply heat to the carbon dioxide to counteract the self-refrigeration of the latter resulting from the withdrawal of vapors.

3. A method of conditioning and supplying carbon dioxide to carbonators, comprising establishing a supply of liquid carbon dioxide in bulk storage in a heat insulated tank, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, and maintaining the vapor pressure of the carbon dioxide remaining in the supply within a relatively narrow range while the vapors are being withdrawn by applying heat to the carbon dioxide at rates which will balance the self-refrigeration of the carbon dioxide resulting from the withdrawal of the vapors.

4. A method of conditioning and supplying carbon dioxide to carbonators, comprising establishing a supply of low temperature liquid carbon dioxide in bulk storage in a heat insulated tank, withdrawing only carbon dioxide vapors from the supply, raising the temperature of the withdrawn carbon dioxide vapors and delivering the heated vapors to the pressure regulators of the carbonators during the entire period of operation of the carbonators, and passing a refrigerant in a closed circuit in heat exchange relation to the water going to the carbonators and the liquid carbon dioxide remaining in the supply to effect refrigeration of the water and to apply heat to the carbon dioxide to counteract the self-refrigeration of the latter resulting from the withdrawal of vapors.

5. A method of conditioning and supplying carbon dioxide to carbonators, comprising establishing a supply of low temperature liquid carbon dioxide in bulk storage in a heat insulated tank, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, and passing a refrigerant in a closed circuit in heat exchange relation to the water going to the carbonators and the liquid carbon dioxide remaining in the supply to effect further refrigeration of the water and to apply heat to the carbon dioxide to counteract the self-refrigeration of the latter resulting from the withdrawal of vapors.

6. A method of conditioning and supplying carbon dioxide to carbonators, comprising establishing a supply of low temperature liquid carbon dioxide in bulk storage in a heat insulated tank, withdrawing only carbon dioxide vapors from the supply for delivery to the carbonators during the entire period of operation of the carbonators, passing a brine in a closed circuit in heat exchange relation to the water going to the carbonators and the liquid carbon dioxide remaining in the supply to effect refrigeration of the water and to apply heat to the carbon dioxide to counteract the self-refrigeration of the latter resulting from the withdrawal of vapors, by-passing the brine around the carbon dioxide in the supply when heating thereof is not required, and flowing the by-passed brine in heat exchange relation with another cooling medium so that the brine can continue to refrigerate the water.

7. A method of conditioning and supplying carbon dioxide to carbonators, comprising establishing a supply of low temperature liquid carbon dioxide in bulk storage in a heat insulated tank, withdrawing only carbon dioxide vapors from the supply, raising the temperature of the withdrawn carbon dioxide vapors and delivering the heated vapors to the pressure regulators of the carbonators during the entire period of operation of the carbonators, passing a brine in a closed circuit in heat exchange relation to the water going to the carbonators and the liquid carbon dioxide remaining in the supply to effect refrigeration of the water and to apply heat to the carbon dioxide to counteract the self-refrigeration of the latter resulting from the withdrawal of vapors, by-passing the brine around the carbon dioxide in the supply when heating thereof is not required, and flowing the by-passed brine in heat exchange relation with another cooling medium so that the brine can continue to refrigerate the water.

8. A method of conditioning and supplying carbon dioxide to carbonators, comprising establishing a supply of low temperature liquid carbon dioxide in bulk storage in a heat insulated tank, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, passing a brine in a closed circuit in heat exchange relation to the water going to the carbonators and the liquid carbon dioxide remaining in the supply to effect further refrigeration of the water and to apply heat to the carbon dioxide to counteract the self-refrigeration of the latter resulting from the withdrawal of vapors, by-passing the brine around the carbon dioxide in the supply when heating thereof is not required, and flowing the by-passed brine in heat exchange relation with another cooling medium so that the brine can continue to refrigerate the water.

9. A method of conditioning and supplying carbon dioxide to carbonators, comprising establishing a supply of liquid carbon dioxide in bulk storage in a heat insulated tank, withdrawing only carbon dioxide vapors from the supply for delivery to the carbonators during the entire operating period of the carbonators, and maintaining the vapor pressure of the carbon dioxide remaining in the supply within a relatively narrow range while the vapors are being withdrawn by passing a liquid, having a higher temperature than the stored liquid carbon dioxide, in heat exchange relation to the liquid carbon dioxide while the vapor pressure is between certain values and by applying additional heat to the said higher temperatured liquid, prior to its passage in heat exchange relation with the stored carbon dioxide, when the vapor pressure falls below said certain values.

10. A method of conditioning and supplying carbon dioxide to carbonators, comprising establishing a supply of liquid carbon dioxide in bulk storage in a heat insulated tank, withdrawing only carbon dioxide vapors from the supply, raising the temperature of the withdrawn carbon dioxide vapors and delivering the heated vapors to the pressure regulators of the carbonators during the entire period of operation of the carbonators, and maintaining the vapor pressure of the carbon dioxide remaining in the supply within a relatively narrow range while the vapors are being withdrawn by passing a liquid, having a higher temperature than the stored liquid carbon dioxide, in heat exchange relation to the liquid carbon dioxide while the vapor pressure is between certain values and by applying additional heat to the said higher temperature liquid, prior to its passage in heat exchange relation with the stored carbon dioxide, when the vapor pressure falls below said certain values.

11. A method of conditioning and supplying carbon dioxide to carbonators, comprising establishing a supply of liquid carbon dioxide in bulk storage in a heat insulated tank and at a preselected subatmospheric temperature and its corresponding vapor pressure, withdrawing only carbon dioxide vapors from the supply for delivery to the carbonators during the entire operation period of the carbonators, maintaining the vapor pressure of the carbon dioxide remaining in the supply within a relatively narrow range while the vapors are being withdrawn by passing brine in a closed circuit in heat exchange relation to water going to the carbonators and the liquid carbon dioxide remaining in the supply to effect refrigeration of the water and to apply heat to the carbon dioxide, preventing a rise in carbon dioxide vapor pressure beyond a predetermined extreme pressure value which is above the maximum value of the aforesaid range, during any given period when the amount of vapors withdrawn from the tank is not sufficient to maintain the vapor pressure within said relatively narrow range, by flowing a refrigerant in heat exchange relation to the carbon dioxide, by-passing the brine around the carbon dioxide in the supply when heating of the carbon dioxide is not required and flowing the by-passed brine in heat exchange relation to the aforesaid refrigerant for the carbon dioxide so that the brine can continue to refrigerate the water.

12. A method of conditioning and supplying carbon dioxide to carbonators, comprising establishing a supply of liquid carbon dioxide in bulk storage in a heat insulated tank, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, and maintaining the vapor pressure of the carbon dioxide remaining in the supply within a relatively narrow range while the vapors are being withdrawn by passing a liquid, having a higher temperature than the stored liquid carbon dioxide, in heat exchange relation to the liquid carbon dioxide while the vapor pressure is between certain values and by applying additional heat to the said higher temperatured liquid, prior to its passage in heat exchange relation with the stored carbon dioxide, when the vapor pressure falls below said certain values.

13. A method of conditioning and supplying carbon dioxide to carbonators, comprising establishing a supply of liquid carbon dioxide in bulk storage in a heat insulated tank and at a preselected subatmospheric temperature and its corresponding vapor pressure, withdrawing only carbon dioxide vapors from the supply, raising the temperature of the withdrawn carbon dioxide vapors and delivering the heated vapors to the pressure regulators of the carbonators during the entire period of operation of the carbonators, and maintaining the vapor pressure of the carbon dioxide remaining in the supply within a relatively narrow range while the vapors are being withdrawn by applying heat to the carbon dioxide in varying amounts in response to variations in the vapor pressure of the supply to thereby balance the self-refrigeration of the carbon dioxide resulting from the withdrawal of the vapors.

14. A method of conditioning and supplying carbon dioxide to carbonators, comprising establishing a supply of liquid carbon dioxide in bulk storage in a heat insulated tank and at a pre-selected subatmospheric temperature and its corresponding vapor pressure, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, and maintaining the vapor pressure of the carbon dioxide remaining in the supply within a relatively narrow range while the vapors are being withdrawn by applying heat to the carbon dioxide in varying amounts in response to variations in the vapor pressure of the supply to thereby balance the self-refrigeration of the carbon dioxide resulting from the withdrawal of the vapors.

15. A method of conditioning and supplying carbon dioxide to carbonators, comprising establishing a supply of liquid carbon dioxide in bulk storage in a heat insulated tank and at a preselected subatmospheric temperature and its corresponding vapor pressure, withdrawing only carbon dioxide vapors from the supply for delivery to the carbonators during the entire operating period of the carbonators, and maintaining the vapor pressure of the carbon dioxide remaining in the supply within a relatively narrow range while the vapors are being withdrawn by passing a liquid, having a higher temperature than the stored liquid carbon dioxide, in heat exchange relation to the liquid carbon dioxide while the vapor pressure is between certain values and by applying additional heat to the said higher temperatured liquid, prior to its passage in heat exchange relation with the stored carbon dioxide, when the vapor pressure falls below said certain values.

16. Apparatus for conditioning and supplying carbon dioxide to carbonators, comprising a heat insulated bulk storage tank for liquid carbon dioxide, a vapor draw-off line extending from the tank to pressure regulators for the carbonators, a line for supplying water to the carbonators, a single heat exchange device connected in said vapor draw-off line and said water supply line for effecting the transfer of heat from the water to the vapors, a heating coil in the storage space of the tank, means for flowing through the heating coil fluid having a higher temperature than the temperature of the carbon dioxide stored in the tank, and control means operating in response to pressure variations in the tank for controlling the flow of the fluid through the heating coil.

17. Apparatus for conditioning and supplying carbon dioxide to carbonators, comprising a heat insulated bulk storage tank for liquid carbon dioxide, a vapor draw-off line extending from said tank to the pressure regulators of carbonators, a line for supplying water to the carbonators, a single heat exchange device connected in said vapor draw-off line and said water supply line for effecting the transfer of heat from the water to the vapor, an electric heater element positioned within the storage space of the tank, and control means operating in response to variations in vapor pressure in the storage tank for turning on and off the supply of current to the heating element.

18. A method of conditioning and supplying carbon dioxide to carbonators, comprising establishing a supply of low temperature liquid carbon dioxide in bulk storage in a heat insulated tank, withdrawing only carbon dioxide vapors from the supply for delivery to the carbonators during the entire period of operation of the carbonators, and lowering the temperature of the water going to the carbonators and raising the temperature of the liquid carbon dioxide remaining in the supply, to counteract the self-refrigeration of the latter resulting from the withdrawal of vapors, by effecting the transfer of heat from the water to the liquid carbon dioxide.

19. A method of conditioning and supplying carbon dioxide to carbonators, comprising establishing a supply of liquid carbon dioxide in bulk storage in a heat insulated tank, withdrawing only carbon dioxide vapors from the supply, raising the temperature of the withdrawn vapors and lowering the temperature of the water going to the carbonators by passing the two in heat exchange relation, delivering the heated vapors to the pressure regulators of the carbonators during the entire period of operation of the carbonators, and maintaining the vapor pressure of the carbon dioxide remaining in the supply within a relatively narrow range while the vapors are being withdrawn by periodically diverting the water from its flow to the carbonators and flowing it in heat exchange relation to the carbon dioxide to counteract the self-refrigeration of the latter resulting from the withdrawal of vapors.

20. A method of conditioning and supplying carbon dioxide to carbonators, comprising establishing a supply of liquid carbon dioxide in bulk storage in a heat insulated tank, withdrawing only carbon dioxide vapors from the supply for delivery to the carbonators during the entire operating period of the carbonators, and maintaining the vapor pressure of the carbon dioxide remaining in the supply below a predetermined maximum value and above the pressure at which the liquid carbon dioxide will solidify, while the vapors are being withdrawn, by flowing a higher temperatured liquid in heat exchange relation to the liquid carbon dioxide whenever the vapor pressure is below said maximum value and by raising the temperature of the said higher temperatured liquid above its normal value, prior to its passage in heat exchange relation with the stored carbon dioxide, whenever the vapor pressure falls below a certain value that is lower than said maximum value.

21. Apparatus for conditioning and supplying carbon dioxide to carbonators, comprising a heat insulated bulk storage tank for liquid carbon dioxide, a vapor draw-off line extending from the tank to pressure regulators for the carbonators, a line for supplying water to the carbonators, a single heat exchange device connected in said vapor draw-off line and said water supply line for effecting the transfer of heat from the water to the vapors, a heating coil in the storage space of the tank, a cooling coil in the path of flow of the water going to the carbonators, said heating and cooling coils being interconnected for the flow therethrough of a single medium which will transfer heat from the water to the liquid carbon dioxide in the tank, and means for establishing and stopping the circulation of said medium through said heating coil.

22. Apparatus for conditioning and supplying carbon dioxide to carbonators, comprising a heat insulated bulk storage tank for liquid carbon dioxide, a vapor draw-off line extending from the tank to pressure regulators for the carbonators, a line for supplying water to the carbonators, a single heat exchange device connected in said vapor draw-off line and said water supply line for effecting the transfer of heat from the water to the vapors, a heating coil in the storage space of the tank, a cooling coil in the path of flow of the water going to the carbonators, said heating and cooling coils being interconnected for the flow therethrough of a single medium which will transfer heat from the water to the liquid carbon dioxide in the tank, means for establishing and stopping the circulation of said medium through said heating coil, a refrigerating circuit, and means for circulating the said single medium in heat exchange relation to the refrigerating circuit when the medium is not circulating through the heating coil to enable the medium to continue to extract heat from the water in circulating through the cooling coil.

ERIC GEERTZ.
CHARLES A. GETZ